United States Patent [19]

Pastor et al.

[11] 4,234,662
[45] Nov. 18, 1980

[54] PRESSURE SENSITIVE HOT MELT ADHESIVE CURABLE BY EXPOSURE TO ELECTRON BEAM RADIATION

[75] Inventors: Stephen D. Pastor, Spring Valley, N.Y.; Stuart H. Ganslaw, Morristown, N.J.

[73] Assignee: National Starch and Chemical Corporation, Bridgewater, N.J.

[21] Appl. No.: 33,199

[22] Filed: Apr. 26, 1979

[51] Int. Cl.$^2$ ............................................. B05D 3/06
[52] U.S. Cl. ................................. 428/500; 204/159.14; 204/159.22; 427/44; 427/54.1; 526/327
[58] Field of Search ............... 427/44, 54; 428/500; 204/159.14, 159.22; 526/327

[56] References Cited

U.S. PATENT DOCUMENTS

| | | | |
|---|---|---|---|
| 2,278,637 | 4/1942 | Barnes | 526/327 |
| 2,456,647 | 12/1948 | Rehberg et al. | 526/327 |
| 2,643,991 | 6/1953 | Tawney | 526/327 |
| 3,219,610 | 11/1965 | Tillson | 526/327 |
| 4,052,527 | 10/1977 | Pastor et al. | 428/463 |
| 4,151,055 | 4/1979 | Stueben et al. | 427/54 |
| 4,165,266 | 8/1979 | Stueben et al. | 427/44 |

*Primary Examiner*—John H. Newsome
*Attorney, Agent, or Firm*—Edwin Szala; Ellen T. Dec

[57] ABSTRACT

Hot melt pressure sensitive adhesives are prepared by free-radical copolymerizing an acrylic-based comonomer(s) with allyl acrylate or methacrylate to produce a prepolymer with an ethylenically saturated backbone containing pendant allylic unsaturation which is then applied in fluid form to a substrate and thereafter subjected to electron beam curing.

10 Claims, No Drawings

PRESSURE SENSITIVE HOT MELT ADHESIVE CURABLE BY EXPOSURE TO ELECTRON BEAM RADIATION

FIELD OF THE INVENTION

This invention relates to improved pressure sensitive hot melt adhesives. More specifically, it relates to a novel process for the production of hot melt adhesives having pressure sensitive properties comprising the steps of free-radical copolymerizing an acrylic-based comonomer(s) with allyl acrylate or methacrylate to produce a prepolymer with an ethylenically saturated backbone containing pendant allylic unsaturation which is then applied in fluid form to a substrate and thereafter subjected to electron beam curing. The use of this prepolymer enables the material to be applied in hot melt form and, upon exposure to electron beam radiation, to cure to provide a high molecular weight pressure sensitive adhesive displaying improved tack, cohesive strength and end use performance now only obtainable from solvent systems.

BRIEF DESCRIPTION OF THE PRIOR ART

Pressure sensitive adhesive compositions comprise a class of adhesives which when coated on a suitable substrate share the common characteristic of being aggressive and permanently tacky at room temperature and are thus able to adhere to surfaces by the application of nothing more than manual pressure.

Hot melt adhesives are solid materials at room temperature. Application of heat melts the solid adhesive bringing it to the liquid or fluid state in which form it is applied to a substrate; on cooling, the adhesive then regains its solid form.

This invention is directed to a process for producing hot melt pressure sensitive adhesives, i.e., adhesives which are applied in the liquid or fluid state at elevated temperatures and, upon cooling, form solid coatings which are permanently tacky and which adhere on mere contact with adhesive receptive surfaces to which they are applied. Adhesives of this type may be applied to various substrates such as paper, cloth and plastic films and the resulting coated substrates may then be converted into tapes and labels which are especially useful in the packaging field for any number of applications involving marking, sealing, reinforcing or bonding or are useful in the pharmaceutical or health field for such applications as bandages.

In preparing a pressure sensitive hot melt adhesive, the desirable properties include a high cohesive strength at room temperature for good holding power, low shrinkage of the adhesive film on flexible plastic substrates and retention of pressure sensitive properties (i.e., tack retention) during storage and use together with a relatively fluid viscosity at commonly employed application temperatures of 120° to 180° C.

Acrylic polymers and copolymers have found extensive use as the base polymers in pressure sensitive adhesive lacquers or water-based systems mainly because of their clarity, adhesion to non-primed surfaces, good aging characteristics, as well as their excellent properties of tack, peel and cohesive strength. Many attempts to utilize acrylic polymers or copolymers in pressure sensitive hot melt adhesives have not proven successful because of difficulties associated with melt viscosity. In order to have a hot melt adhesive that is sufficiently fluid at application temperatures, either a very low molecular weight polymer must be used or a high molecular weight polymer must be extended with a high proportion of low molecular weight oils or resins (tackifiers) to reduce the melt viscosity. Both of these alternatives are undesirable since low molecular weight polymers will produce adhesives which lack cohesive strength and the use of expensive additives will frequently detract from the cohesion or tack of the resultant adhesive.

Previous attempts to render acrylic polymers or monomer/oligomer systems useful for hot melt applied pressure sensitive adhesives by incorporating therein photoinitiators and subjecting the compositions to actinic radiation have not been successful since it has been difficult to cure the compositions to the proper degree of tackiness. A usual result is an overcured, hard coating possessing little, if any, pressure sensitivity. Moreover, many of the photoinitiators were also sensitive to visible light wavelengths and this sensitivity caused further curing of the adhesive during storage or use thereof. Finally, for many applications such as surgical bandaging, it is necessary that any externally added components (e.g., photoinitiators) be fully bound into the final composition; many of the compositions of the prior art contained photoinitiators which leached out during use.

Hot melt pressure sensitive adhesives have been prepared (see U.S. Pat. No. 4,052,527) by subjecting an acrylic prepolymer containing specific monomeric photoinitiators to ultraviolet radiation. The use of ultraviolet radiation to cure hot melt compositions is, however, limited by its penetrating power, being able to cure only relatively thin films since ultraviolet curing of thicker films results in undesirable stratification (layering) and consequent weakness of the final bond. Moreover, this method is unsatisfactory when curing of pigmented coatings is desired or when it is necessary to cure a coating through an opaque overlaying material, e.g., a release sheet.

Electron beam curable acrylic hot melts have also been marketed but these compositions required such high levels of radiation (generally on the order of 10 megarads) in order to achieve curing, that the consequent cost and dangers associated therewith outweight the advantages obtained thereby.

It is therefore an object of the present invention to provide a process for the production of pressure sensitive hot melt adhesives which display excellent properties of tack, tack retention and cohesive strength, yet which are characterized by relatively low melt viscosity for ease of application.

It is a further object to provide a process for the production of pressure sensitive hot melt adhesives curable using low levels of electron beam radiation and useful in the curing of films regardless of thickness, pigmentation or the presence of overlay sheets.

These and other objects will be apparent from the description which follows.

SUMMARY OF THE INVENTION

In accordance with the present invention, acrylate-based pressure sensitive hot melt adhesives are prepared by copolymerizing allyl acrylate or methacrylate with at least one acrylate-based copolymerizable monomer to obtain a prepolymer solid at ambient temperatures; heating the resultant solid allylic unsaturated prepolymer to a temperature sufficient to render it flowable and fluid; coating the fluid adhesive on the desired substrate and thereafter exposing the adhesive coated substrate to electron beam radiation of 1–4 megarads sufficient to crosslink the prepolymer, thereby providing a cured pressure sensitive adhesive.

The resulting adhesive coated surface possesses excellent tack, cohesive strength, and tack retention upon storage and use, contains no unbound photoinitiator and yet is readily applied at low melt viscosity using conventional hot melt equipment. Moreover the adhesive may be coated on the surface regardless of thickness, pigmentation or the presence of overlay sheets, yet will be uniformly cured throughout upon exposure to electron beam radiation.

DETAILED DESCRIPTION OF THE PREFERRED EMBODIMENTS

Pressure sensitive adhesives based on acrylate ester homo- and copolymers are well known to those skilled in the art. It is to be noted that the process of the present invention is adaptable to be used with all such pressure sensitive adhesives.

Thus, the acrylate-based copolymerizable monomers which may be used include those acrylate ester monomers selected from the group consisting of the alkyl esters of acrylic and methacrylic acid wherein the alkyl groups contain 4 to 9 carbon atoms, preferably 4 to 8 carbon atoms. Such esters include n-butyl acrylate, n-pentyl acrylate, n-hexyl acrylate, n-heptyl acrylate, n-octyl acrylate, n-nonyl acrylate; their correspondingly branched isomers such as 2-ethylhexyl acrylate, etc. as well as the corresponding methacrylate esters.

Optionally, the pressure sensitive adhesive may be prepared with one or more polymerizable comonomers selected from the groups consisting of vinyl esters, vinyl ethers, vinyl halides, vinylidene halides, nitriles of ethylenically unsaturated hydrocarbons as well as with other acrylate monomers such as methyl acrylate and methyl methacrylate which are not considered tacky or pressure sensitive. Examples of optional comonomers include vinyl acetate, t-octyl acrylamide, acrylic acid, vinyl ethyl ether, vinyl chloride, vinylidene chloride, acrylonitrile, maleic anhydride and styrene.

It is to be noted that the $C_4$–$C_9$ alkyl esters of acrylic acid will ordinarily constitute at least about 50% by weight of the total copolymer in order to ensure sufficient pressure sensitivity in the resultant adhesive. The relative amounts of the specific components making up the acrylate-based adhesive are dependent upon the final properties desired and the end used contemplated; they are conventional and known in the art.

The allyl acrylate or methacrylate component employed should be present in the copolymer in an amount of about 0.1 to 2, preferably 0.3 to 0.75 parts, by weight of the copolymer.

As will be recognized by those skilled in the art, the preparation of the interpolymer containing the acrylic copolymer and allyl acrylate or methacrylate component can be carried out using well-known free radical initiated polymerization procedures. Thus, the interpolymer can be prepared by solution, emulsion or bulk polymerization procedures; formed into a hot melt by removal of the solvent, coagulation of the latex, etc. The adhesive interpolymer may also comprise various other additives such as plasticizers, tackifiers, fillers, etc. which are conventionally used in the preparation of hot melt and/or pressure sensitive adhesives.

During use, the hot melt composition need only be heated to a temperature of about 120° C. to 180° C. to render the composition fluid and flowable and to allow the composition to remain flowable for the time required for application thereof.

If the adhesive composition is to be applied to a backing or substrate, this procedure may be accomplished using any conventional means such as roller, slot orifice, spray or extrusion coating. The backing onto which the hot melt composition is applied may be selected from a variety of materials including fabric, plastic film, non-woven fiber sheets, metal sheets or foil, rubber or synthetic rubber, decorative sheets, plywood decals, etc. If the coated substrate is to be used in the form of a roll, the back of the tape is usually coated with a release backsize or adhesive coating. Double sided coated adhesive articles may also be prepared and a strippable paper or other protective means inserted if the article is to be rolled. Additionally, substrates may be laminated onto the adhesive-coating backing in situ, i.e. the hot melt coating may be applied to the backing and the substrate placed over the adhesive. Alternatively, a pressure sensitive adhesive film may be formed by applying the hot melt to a release material such as silicone coated paper; then, after curing, it may then be stripped from the release material and used as a film.

After the hot composition is applied, it may be cured immediately or it may be allowed to cool to a temperature at which it is no longer flowable prior to the radiation step.

The resulting adhesive coatings are then crosslinked (cured) by exposure to electron beam radiation. While there is no upper limit to the radiation that can be applied, the curing effect desired in the practice of the invention can be accomplished using radiation at a level of 1–4 megarads which is sufficient to accomplish the desired amount of crosslinking, and preferably 3–4 megarads. The radiation level required will be dependent upon the nature and intensity of the radiation, the adhesive system, the thickness of the film, environmental factors, etc.

As the source of radiation, high energy beams from an electron accelerator are preferred since an adequate curing dosage is readily obtained and the rate of processing can be greatly increased. Other high energy radiation such as gamma rays, X-rays and beta rays may, however, also be used. Various types of high power electron linear accelerators are available commercially. Since the radiation levels required herein are relatively low, small power units such as the Electrocurtain ® Processor available from Energy Sciences, Inc., Burlington, Mass. are suitable for use herein.

The unique adhesive compositions formed by the present process find application in a wide variety of products where non-leachable pressure sensitive materials are required such as for bandages or other medical applications. The adhesives are also useful in the production of vinyl wall coverings, tapes, labels and decals, as well as in such other applications wherein solution acrylics are presently employed. This process therefore offers an advantage to the previously employed solution acrylics by eliminating the need for solvent removal after application of the adhesive while providing a composition possessing superior cohesive and adhesive properties. Furthermore, the resultant crosslinked adhesives are characterized by resistance to solvents in which they would ordinarily dissolve or soften, by increased Williams plasticity values and by superior pressure sensitive properties. Thus, the hot melt adhesives of this invention have melt viscosities between about 4000 and 100,000 cps., preferably from about 5000 to 25,000 cps at 180° C. The interpolymers employed herein may have a negligible or unmeasurable low standard Williams plasticity number before exposure to electron beam radiation. Plasticity may be defined as the property of a polymeric material which enables it to be deformed permanently and continuously without rupture, upon the application of a force thereto. This property is measured by the use of a William's Plastometer which is manufactured by Scott Testers, Inc. and is designed to conform to the standards set by ASTM Method D-926. In some cases, it is preferred that the interpolymer have negligible (0.4–1.3) plasticity before exposure and at least about 1.8 after exposure. Thus, an advantage of the method of the present invention is that it allows the use of essentially fluid, low cohesive materials or materials with no or low plasticity to be transformed into useful elastomeric adhesives of higher plasticity. The final plasticity of the adhesive is usually between 2–3 although where the plasticity is above this level, some added tackifiers may be provided to produce the desired properties.

The examples set forth below serve to illustrate the process of the invention in certain of its embodiments. All parts and percentages in these examples as well as throughout the specification are by weight and temperature in degrees Celsius unless otherwise specified.

In the examples the following testing procedures are employed to measure the comparative properties of the various adhesives.

180° Peel Adhesion Test (ASTM Method D-1000)

This test consists of measuring the force necessary to strip or delaminate the adhesive film test sample (1 inch×6 inch×1.5 mils) coated on 2 mil polyester film from a stainless steel panel at a rate of pull, or withdrawal, of 12 inches per minute. An Instron Tensile Tester was used to provide the pulling force. Thus, the force necessary to effect delamination is recorded as the "180° Peel Adhesion" value. Tests were taken after only 20 minutes and then again after standing for various periods of time at the temperatures noted in the examples. Values are shown in lbs/in. with the higher values indicating the best results. It is noted that the adhesives prepared in accordance with the present invention suffer a reduction in peel; however, the values obtained after irradiation are still commercially acceptable and are more then compensated by the improvements in Williams plasticity and cohesive strength.

Shear Adhesion Test (PSTC Method 7)

The shear strength is measured by transferring the adhesive onto a 2-mil thick polyethylene terephthalate (Mylar) of vinyl sheet (as noted in the example) at a dry weight of 0.018–0.022 gm/in². The coated sample is then applied to a steel panel with a 0.5 inch overlap joint. A one pound weight is suspended from the sample with the steel panel maintained vertically and the time until separation occurs is measured. The test is carried out at 23° C. and 50% relative humidity. The test is a measure of the cohesive strength and ability to maintain cohesive strength over a period of time. Thus, the adhesives showing the longest times are preferred.

EXAMPLE I

This example illustrates a process for the preparation of a hot melt, pressure sensitive adhesive in accordance with the present invention.

A three liter flask equipped with a thermometer, a reflex condenser, a source of mechanical agitation and slow addition funnels was initially charged with 50 grams methyl acrylate, 50 grams 2-ethylhexyl acrylate, 250 grams methyl alcohol, 75 grams isopropyl alcohol and 1 gram t-butyl peroxypivalate.

The mixture was brought to reflux after which the following monomer and catalyst charges were added simultaneously in increments over a three-hour period: a monomer charge of 150 grams methyl acrylate, 550 grams 2-ethylhexyl acrylate, 200 grams methyl methacrylate and 5 grams allyl methacrylate, and a catalyst charge of 280 grams methyl alcohol and 11.5 grams t-butyl peroxypivalate.

After completion of the addition, the reaction mixture was held at reflux for two hours, cooled and 5 grams Irganox 1010 post added. The solvent was removed by distillation and heated to 110° C. for one hour at 15 mm Hg to produce the resultant saturated polymer designated composition A.

As a comparison, three compositions containing the functional monomers 3-(pentachlorophenoxy)-2-hydroxypropyl methacrylate (3-PCP-2-HPMA), glycidyl methacrylate, and a straight nonfunctional acrylic were made using the method described above. The components and amounts are as follows:

|  | Monomer Composition | | |
| --- | --- | --- | --- |
|  | B | C | D |
| 2-Ethylhexyl Acrylate | 58.5 | 60 | 60 |
| Methyl Acrylate | 20 | 20 | 20 |
| Methyl Methacrylate | 16.5 | 15 | 20 |
| 3-PCP-2-HPMA | 5.0 | — | — |
| Glycidyl Methacrylate | — | 5 | — |

The resultant compositions (A–D) were heated to 180° C., applied to release paper in an amount of 16 lbs/ream or 1 dry mil and allowed to cool. The coated paper was then exposed to electron beam radiation ranging from 1 to 4 megarads. Each sample was then tested for peel strength and shear strength and the following results obtained.

|  | megarads Exposure | | | | |
| --- | --- | --- | --- | --- | --- |
|  | 0 | 1 | 2 | 3 | 4 |
| Sample A | | | | | |
| 180° Peel (Pli) | 4.0 | 3.8 | 3.2 | 3.1 | 3.0 |
| 4 PSI Hold | 16 min. | 5 hrs. | 7 hrs. | 9 hrs. | >20 hrs. |
| Sample B | | | | | |
| 180° Peel (Pli) | 4.7 | 4.5 | 4.5 | 4.2 | 4.1 |
| 4 PSI Hold | 7 min. | 9 min. | 10 min. | 12 min. | 14 min. |
| Sample C | | | | | |
| 180° Peel (Pli) | 5.1 | 5.1 | 5.1 | 4.9 | 4.4 |
| 4 PSI Hold | 10 min. | 10 min. | 10 min. | 11 min. | 15 min. |
| Sample D | | | | | |
| 180° Peel (Pli) | 4.1 | 4.1 | 4.1 | 4.0 | 3.9 |
| 4 PSI Hold | 10 min. | 10 min. | 12 min. | 13 min. | 14 min. |

The results presented above indicate the dramatic improvement in shear strength obtained using allyl methacrylate in accordance with the present invention and contrasted with only minimal loss in peel when compared with compositions containing other monomers.

EXAMPLE II

Using the procedure, catalyst and solvent employed in Example I, pressure sensitive hot melt adhesives were prepared by coating interpolymers having the following compositions onto the desired substrates and exposing to electron beam radiation of 2 megarads. The resultant adhesives were tested for shear strength (4 psi hold) as described in Example 1.

|  | Monomer Compositions | | |
| --- | --- | --- | --- |
|  | E | F | G |
| 2-Ethylhexyl Acrylate | 60 | 60 | 60 |
| Methyl Methacrylate | 19.75 | 19.6 | 19.25 |
| Methyl Acrylate | 20 | 20 | 20 |
| Allyl Methacrylate | 0.25 | 0.4 | 0.75 |
| 4 PSI Hold | 1 hr. | 5 hrs. | 7 hrs. |

EXAMPLE III

Using the procedure, catalysts and solvents described in Example I, pressure sensitive hot melt adhesives may be prepared by coating the resultant copolymers (prepolymers) formed from the ingredients listed in Table I onto the desired substrates and exposing to electron beam radiation.

|  | Monomer Compositions | | | | |
| --- | --- | --- | --- | --- | --- |
|  | H | J | K | L | M |
| 2-Ethylhexyl Acrylate | 60 | 59.5 | — | — | 60 |
| Butyl Acrylate | — | — | 60 | 60 | — |
| Methyl Methacrylate | — | 10 | 20 | 19.5 | 19.6 |
| Methyl Acrylate | 9.5 | — | 19.5 | — | 20 |
| Vinyl Acetate | 30 | — | — | 10 | — |
| Ethyl Acrylate | — | 30 | — | 10 | — |
| Allyl Methacrylate | 0.5 | 0.5 | 0.5 | 0.5 | — |
| Allyl Acrylate | — | — | — | — | 0.4 |

The resultant irradiated compositions will possess excellent adhesive properties even after storage for extended periods of time and are readily removable from any substrate to which they are adhered.

Summarizing, it is seen that the addition of allyl acrylate or methacrylate into the backbone of acrylate-based hot melt adhesives results in the production of prepolymeric adhesives which, when cured by exposure to electron beam radiation, are characterized by superior pressure sensitive properties.

Variations may be made in proportions, procedures and materials without departing from the scope of the invention as defined by the following claims.

We claim:
1. A method for the production of a hot melt adhesive composition having pressure sensitive properties comprising the steps of
   (a) copolymerizing allyl acrylate or methacrylate with at least one copolymerizable acrylic monomer, obtaining thereby a prepolymer solid at ambient temperature;
   (b) heating the resultant solid allylic unsaturated prepolymer to a temperature sufficient to render it fluid and flowable;
   (c) coating the fluid prepolymer onto a substrate; and
   (d) exposing the coated substrate to electron beam radiation of 1–4 megarads sufficient to crosslink the prepolymer, thereby providing a cured pressure sensitive adhesive.
2. The method of claim 1 wherein the prepolymer comprises a composition of allyl methacrylate and a copolymerizable acrylic monomer.
3. The method of claim 1 wherein the prepolymer contains at least one monomer selected from the group consisting of the $C_4$–$C_9$ alkyl esters of acrylic and methacrylic acid.
4. The method of claim 1 wherein the copolymerizable acrylic monomer is selected from the group consisting of the $C_4$–$C_9$ alkyl esters of acrylic acid and is present in the prepolymer in an amount of at least about 50% by weight of the prepolymer.
5. The method of claim 1 wherein the allyl acrylate or methacrylate is present in an amount of 0.1 to 2 parts by weight of the prepolymer.
6. The method of claim 1 wherein the allyl acrylate or methacrylate is present in an amount of 0.3 to 0.75 parts by weight of the prepolymer.
7. The method of claim 1 wherein the allylic unsaturated prepolymer is heated to a temperature of 120°–180° C. to render it fluid and flowable.
8. The method of claim 1 wherein the coated prepolymer is exposed to an electron beam source of 3–4 megarads.
9. A crosslinked pressure sensitive adhesive composition prepared by the method of claim 1.
10. A crosslinked pressure sensitive adhesive-coated article comprising a substrate having thereon a layer of the adhesive prepared by the method of claim 1.

* * * * *